United States Patent Office 3,056,783
Patented Oct. 2, 1962

3,056,783
4-CHLORO-1,2,3-TRIAZINO[5,4-d]PYRIMIDINES
Viktor Papesch, Morton Grove, Ill., and Raymond M. Dodson, Minneapolis, Minn., assignors to G. D. Searle & Co., Chicago, Ill., a corporation of Delaware
No Drawing. Filed Dec. 16, 1960, Ser. No. 76,134
3 Claims. (Cl. 260—249.5)

The present invention relates to a novel group of binuclear heterocyclic compounds. These compounds are 4-chloro - 5,7-dialkyl-6,8-dioxo-5,6,7,8-tetrahydro-1,2,3-triazino[5,4,-d]pyrimidines and can be represented by the following general structural formula

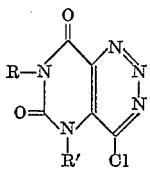

wherein R and R' are lower alkyl radicals.

These compounds can be prepared by nitrating the appropriate 1,3-dialkyl-6-methyluracil with a mixture of fuming nitric acid and concentrated sulfuric acid and reducing the resultant nitro compound with hydrogen and palladium on charcoal. These reactions can be represented by the following equations

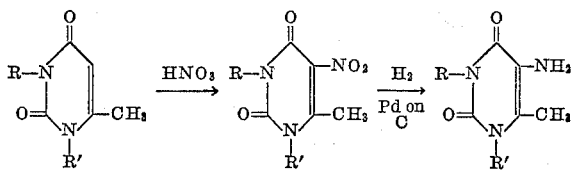

R and R' are lower alkyl radicals.

Diazotization of the amine brings about the formation of a second ring and yields the corresponding 5,7-dialkyl-6,8 - dioxo-5,6,7,8-tetrahydro-1,2,3-triazino[5,4-d]pyrimidine-3N-oxide which can be represented by the following structural formula

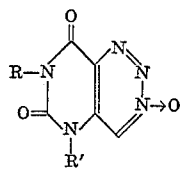

When the above compound is stirred with thionyl chloride at room temperature, 4-chloro-5,7-dialkyl-6,8-dioxo-5,6,7,8-tetrahydro-1,2,3-triazino[5,4-d]pyrimidine is obtained.

The compounds of this invention are antibacterial agents as shown by the fact that they inhibit the growth of *Diplococcus pneumoniae*. They are also inhibitors of seed germination as demonstrated by an inhibition of germination of seeds of Trifolium.

The compounds which constitute this invention and the methods for their preparation will appear more fully from a consideration of the following examples, which are given for the purpose of illustration only and are not to be construed as limiting the invention in spirit or in scope. In these examples, quantities are indicated in parts by weight, temperatures are expressed in degrees centigrade (° C.), and pressures are expressed in millimeters of mercury (mm.).

*Example 1*

A mixture of 71.8 parts of concentrated sulfuric acid and 2.25 parts of fuming nitric acid is cooled to 10° C. To this solution is added with stirring 12.7 parts of 1,3,6-trimethyluracil while the temperature is maintained at 10–20° C. When solution is complete, 7.8 additional parts of fuming nitric acid is added while keeping the temperature at 10–20° C.

The solution is poured onto ice and allowed to stand for 1.5 hours. The precipitate is filtered and washed with ice water. The solid is recrystallized from 50% ethanol to give 1,3,6-trimethyl-5-nitrouracil melting at about 153–154° C.

*Example 2*

A mixture of 36 parts of 1,3,6-trimethyl-5-nitrouracil and 3.6 parts of 5% palladium on charcoal in 1000 parts of water is hydrogenated for 2 hours in a bomb at 70–99° C. and 37–50 atmospheres. The resultant solution is filtered, concentrated to 125 parts under reduced pressure, cooled, and filtered. This yields 1,3,6-trimethyl-5-aminouracil melting at about 169–171° C.

*Example 3*

A solution of 29.8 parts of 1,3,6-trimethyl-5-aminouracil in 292 parts of concentrated hydrochloric acid and 190 parts of ice is stirred and cooled to 0–5° C. Twenty-five parts of sodium nitrite in 41.5 parts of water is slowly introduced below the surface of the amine hydrochloride solution. When the addition is complete, stirring is continued for an additional 1.5 hours and the mixture is allowed to warm to room temperature. The precipitate is filtered, washed with water and with ethanol, and dried in a vacuum desiccator to give 5,7-dimethyl-6,8-dioxo-5,6,7,8-tetrahydro-1,2,3-triazino-[5,4-d]pyrimidine-3N-oxide melting at about 249–250° C. after recrystallization from acetic acid. It has the formula

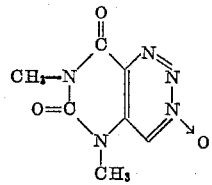

*Example 4*

Seventy parts of 5,7-dimethyl-6,8-dioxo-5,6,7,8-tetrahydro-1,2,3-trazino[5,4-d]pyrimidine-3N-oxide and 2296 parts of thionyl chloride are stirred overnight. The excess thionyl chloride is removed under reduced pressure at a temperature below 35° C. The residue is pulverized, spread on a plate and left under reduced pressure for 2 days in a vacuum desiccator. The crude material is recrystallized twice from 5% ethyl acetate in benzene and twice from methanol. Further purification gives 4-chloro - 5,7 - dimethyl-6,8-dioxo-5,6,7,8-tetrahydro-1,2,3-triazino[5,4-d]pyrimidine melting at about 165–166° C. It has the formula

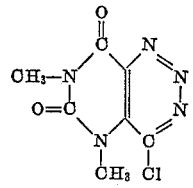

*Example 5*

A mixture of 59.8 parts of concentrated sulfuric acid and 3 parts of fuming nitric acid is cooled in an ice bath. To this solution is slowly added with stirring 12.5 parts of finely powdered 1,3-diethyl-6-methyluracil while the temperature is maintained at 10–15° C. When solution is complete, 6.8 additional parts of fuming nitric acid is added while maintaining the temperature below 15° C.

The solution is poured onto ice and stirred to promote crystallization. The precipitate is filtered, washed with ice water and recrystallized from 70% ethanol to give 1,3-diethyl-5-nitro-6-methyluracil melting at about 85–86° C.

*Example 6*

A mixture of 27 parts of 1,3-diethyl-5-nitro-6-methyluracil and 3 parts of 5% palladium on charcoal in 800 parts of absolute ethanol is stirred at room temperature and a pressure of 34 atmospheres until no further pressure drop is noted. The resultant mixture is filtered, and the filtrate concentrated to about 80 parts under reduced pressure, cooled, and filtered to yield 1,3-diethyl-5-amino-6-methyluracil melting at about 95–96° C.

*Example 7*

A solution of 16.8 parts of 1,3-diethyl-5-amino-6-methyluracil in 124 parts of 10% hydrochloric acid and 98 parts of crushed ice is stirred and cooled in an ice bath. A solution of 12.1 parts of sodium nitrite in 20 parts of water is added slowly; a precipitate forms. Stirring is continued for 15 minutes after the addition is complete. The suspension is filtered and the precipitate is washed with cold water, absolute alcohol and anhydrous ether. Recrystallization from absolute alcohol yields 5,7-diethyl-6,8 - dioxo-5,6,7,8-tetrahydro-1,2,3-triazino[5,4-d]pyrimidine-3N-oxide melting at about 244–245° C. with decomposition. It has the formula

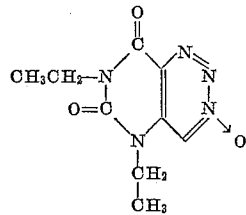

*Example 8*

A mixture of 5 parts of 5,7-diethyl-6,8-dioxo-5,6,7,8-tetrahydro-1,2,3-triazino[5,4-d]pyrimidine-3N-oxide and 82 parts of thionyl chloride is stirred overnight at room temperature. The excess thionyl chloride is removed under reduced pressure while the temperature is maintained below 35° C. The residual solid is treated with 5% hydrochloric acid, warmed on a steam bath and filtered. The solid residue is treated with chloroform and a small amount of insoluble material is filtered off. The solution is dried over sodium sulfate and evaporated to dryness. The crude product is purified by repeatedly dissolving it in about 4 parts of ethyl acetate and then adding about 10 parts of anhydrous ether. This gives 4-chloro-5,7 - diethyl - 6,8-dioxo-5,6,7,8-tetrahydro-1,2,3-triazino-[5,4-d]pyrimidine melting at about 137–138° C. with decomposition. It has the formula

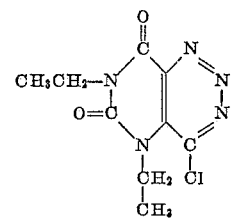

What is claimed is:
1. A compound of the formula

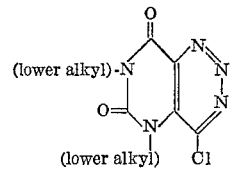

2. 4 - chloro-5,7-dimethyl-6,8-dioxo-5,6,7,8-tetrahydro-1,2,3-triazino[5,4-d]pyrimidine.

3. 4 - chloro - 5,7 - diethyl-6,8-dioxo-5,6,7,8-tetrahydro-1,2,3-triazino[5,4-d]pyrimidine.

References Cited in the file of this patent
FOREIGN PATENTS 563,934   Belgium _____ July 14, 1958

OTHER REFERENCES

Chemical Abstracts, vol. 49, col. 1056 (1955).
Erickson et al.: "The 1,2,3- and 1,2,4-Triazines, Tetrazines and Pentazines," page 41, Interscience Publishers, Inc., New York (1956).